F. O. JAQUES, Jr.
MEANS FOR MAKING CASTELLATED NUTS.
APPLICATION FILED FEB. 28, 1919.

1,314,668.

Patented Sept. 2, 1919.

INVENTOR:
Fernando Oscar Jaques, Jr.,
By Chas. H. Luther
ATTORNEY.

UNITED STATES PATENT OFFICE.

FERNANDO OSCAR JAQUES, JR., OF PROVIDENCE, RHODE ISLAND, ASSIGNOR OF ONE-HALF TO HAROLD CALDWELL PECKHAM, OF CRANSTON, RHODE ISLAND, AND ONE-TWENTIETH TO CHARLES HENRY LUTHER, OF PROVIDENCE, RHODE ISLAND.

MEANS FOR MAKING CASTELLATED NUTS.

1,314,668. Specification of Letters Patent. Patented Sept. 2, 1919.

Application filed February 28, 1919. Serial No. 279,742.

*To all whom it may concern:*

Be it known that I, FERNANDO OSCAR JAQUES, Jr., a citizen of the United States, residing at Providence, in the county of Providence and State of Rhode Island, have invented a new and useful Improvement in Means for Making Castellated Nuts, of which the following is a specification.

In previous means of making castellated nuts the castellations are formed by cutting out portions of the metal, usually by three or more distinct operations of a cutter across the nut or the metal is removed in some other way.

The object of my invention is to improve the means of making castellated nuts, whereby the castellations are formed on the nut by pressure or compression, thereby eliminating the waste in metal heretofore lost in cutting out the metal in forming the castellations.

Another object of my invention is to form the greater portion of the hole through the nut by pressure or compression, thereby saving the metal heretofore lost, in drilling out the hole in the nut.

Further objects of my invention are to improve the construction and reduce the cost of making castellated nuts.

My invention consists in the peculiar and novel construction and operation of means for making castellated nuts, as will be more fully set forth hereinafter and claimed.

Figure 1:
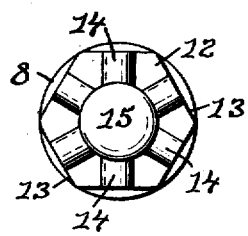
Figure 1 is an end view of the castellating member.
Figure 2:
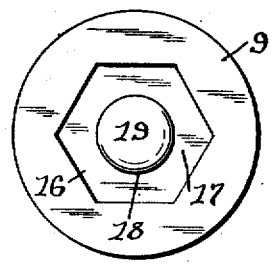
Fig. 2 is an end view of the nut holding member.

In the drawings 8 indicates a castellating member, 9 a nut holding member, 10 a nut blank and 11 a castellated nut.

The castellating member 8 has a hexagonal portion 12 the size of the nut to be castellated, each side 13 of which has at the end a projecting member 14 all shaped to form the castellations on the nut. A round central hole forming stud 15 protrudes from the member 8 as shown in Fig. 3.

The nut holding member 9 has a hexagonal shaped cavity 16 the size of the nut to be castellated. The cavity 16, as shown in Figs. 3 and 4 has a flat nut bottom 17 in which is a round central bore 18 which extends centrally through the member 9. A movable stud member 19 having the same size and shape as the stud 15, is movably supported in the bore 18 and extends into the cavity 16, the distance required, when the nut is being castellated. The stud member 19 has predetermined reciprocating movements operated by a cam, not shown, or other means. The nut 11 has the castellations 20. 20 and the usual flat bottom 21 as shown, in Fig. 6.

Figure 3:
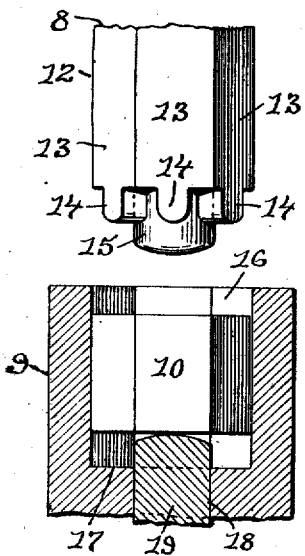
Fig. 3 is a side view of the castellating member and a sectional view of the nut holding member showing the members separated and a nut blank in the nut holding member in a position to be castellated.
Figure 4:
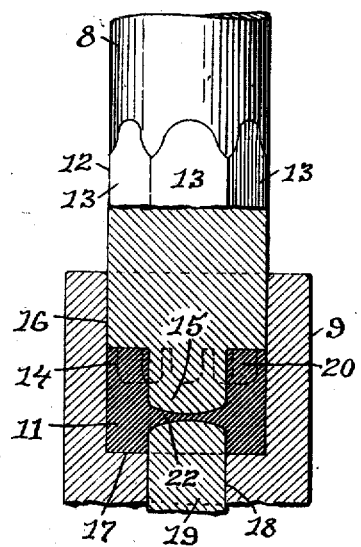
Fig. 4 is a sectional view showing the members closed and the nut blank castellated.
Figure 5:
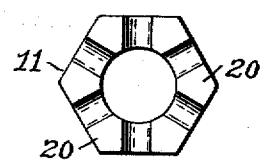
Figs. 5 and 6 are top and side views respectively of the castellated nut.
Figure 6:
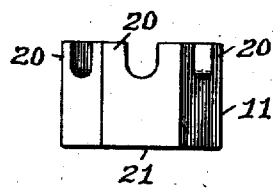

When in use a nut blank 10 is placed in the cavity 16 with the stud member 19 protruding into the cavity, as shown in Fig. 3. The members 8 and 9 are now brought together under the required pressure thereby forming the castellations 20. 20 on the nut blank, as shown in Figs. 4 and 6 and the studs 15 and 19 simultaneously entering the blank forms the greater portion of the hole in the blank, leaving a thin transverse web 22, as shown in Fig. 4. The members 8 and 9 are now separated and the stud member 19 operated against the web 22 to push the castellated nut out of the cavity 16 where it is removed by an air blast or other means. In completing the nut the thin web 22 is punched out and the hole thus formed screw-threaded in the usual way.

As the nut blank now has just the right amount of metal to form the castellations and the greater portion of the hole in the nut, all of the metal heretofore wasted in forming the castellations is saved and approximately nine-tenths of the metal heretofore lost in drilling the hole is also saved, and by condensing the metal by pressure a more perfect and durable castellated nut is produced and at less cost, than has heretofore been done.

It is evident that the same results are obtained whether the means for forming the castellations are on the member 8 or in the member 9.

Having thus described my invention I claim as new:

1. Means for making castellated nuts comprising two operating members having means for holding a nut, means for castellating the nut my compressing the metal of the nut, means for simultaneously forming the greater portion of a hole in the nut by compression, and means for ejecting the castellated nut from the operating members.

2. Means for making castellated nuts comprising a member having a cavity adapted to hold a nut and a member adapted to enter said cavity and having means for forming castellations on the nut by compressing the metal of the nut.

3. Means for making castellated nuts comprising a member having a cavity the shape and size of the nut to be castellated and a member having a portion the shape and size of the nut to be castellated, said member having a sliding fit in said cavity and means for forming castellations on the nut by compressing the metal of the nut.

4. Means for making castellated nuts comprising a member having a cavity the shape and size of the nut to be castellated and a central bore, a movable stud member in the bore and extending into the cavity, a member having a central stud, projecting parts adapted to form castellations on a nut and a sliding fit in the cavity in the first member, whereby castellations are formed on, and the greater portion of a hole is formed in a nut, by compressing the metal of the nut.

In testimony whereof, I have signed my name to this specification.

FERNANDO OSCAR JAQUES, Jr.

Copies of this patent may be obtained for five cents each, by addressing the "Commissioner of Patents, Washington, D. C."